Patented Nov. 11, 1947

2,430,590

UNITED STATES PATENT OFFICE 2,430,590

POLYMERIZATION OF CONJUGATED DIENES IN PRESENCE OF BIOLOGICAL OXIDATION CATALYSTS

William D. Stewart, Akron, Ohio, assignor to The B. F. Goodrich Company, New York, N. Y., a corporation of New York No Drawing. Application December 21, 1943, Serial No. 515,148

4 Claims. (Cl. 260—86.5)

This invention relates to the polymerization of unsaturated organic compounds which are capable of undergoing in aqueous emulsion an addition polymerization to form high molecular weight linear polymers, and particularly to the polymerization in aqueous emulsion of open-chain aliphatic conjugated dienes such as butadiene-1,3 either alone or in admixture with other copolymerizable materials such as the vinyl and vinylidene compounds. The principal object of the invention is to provide a new class of materials which catalyze such polymerizations and enable polymers of improved properties to be obtained.

It is well known that many unsaturated organic compounds such as the open-chain aliphatic conjugated dienes and the vinyl compounds are capable of undergoing in aqueous emulsion an addition polymerization in which the individual molecules of these monomeric materials link together in a substantially linear fashion to form a high molecular weight linear polymer. Many such linear polymers are of the greatest commercial importance, for example, the linear polymers and copolymers prepared wholly or in part from open-chain aliphatic conjugated dienes are synthetic rubbers while many polymers of vinyl compounds are commercially useful thermoplastic resins.

The method of conducting such addition polymerizations in aqueous emulsion is also well known; it involves essentially emulsification of the monomers in an aqueous solution of an emulsifying agent followed by agitation of the emulsion at a temperature of about 20–100° C. for a time sufficient to convert the monomers into linear polymers. Oxygen-yielding compounds such as peroxides and per-salts are also customarily included in the emulsion to initiate the polymerization and thus enable polymer to be formed in a shorter interval of time.

Considerable difficulty is still experienced, however, in obtaining high yields of the desired polymer in as short an interval of time as is desired for commercial manufacture of polymeric materials. Particularly is this true in instances where foreign materials, many of which are inhibitors of polymerization, are inadvertently present during the polymerization or are added to the emulsion for some special purpose.

I have now discovered that substances which function as catalysts for the biological oxidations occurring in the living cell, such as enzymes, vitamines, auxins and the like, are effective catalysts for the polymerization in aqueous emulsion of unsaturated organic compounds to form high molecular weight linear polymers; that the inclusion of catalytic amounts of such substances in the emulsion during the polymerization, particularly when an oxygen-yielding initiator of polymerization is also present, remarkably reduces the time necessary for polymerization and also, in many instances, improves the quality of the resulting product. Accordingly, this invention is concerned with the use of such biological catalysts as catalysts for the emulsion polymerization of unsaturated organic compounds which yield linear polymers, particularly the open-chain aliphatic conjugated dienes.

Substances which possess the property of catalyzing biological oxidations, such as those involved in metabolism or respiration or other desmolyic processes in either plant or animal cells, constitute a class of materials well known to the biochemist. Many such substances have been definitely chemically identified, have been found to possess a variety of chemical structures and have been synthesized in vitro and found to possess the same physiological activity as when found or produced in living cells. Other such substances, while their physiological properties are equally well known, have not been definitely identified. It is to be understood therefore that the broad scope of this invention contemplates the use either singly or in admixture with each other, of substances which possess the property of catalyzing cellular oxidations regardless of their precise chemical nature and regardless of whether or not they must be obtained from living cells.

It is possible however to formulate certain more or less well defined sub-classes of biological oxidation catalysts on the basis of their physiological behavior and chemical nature. Thus as examples of biological oxidation catalysts there may be mentioned: (1) the oxidation enzymes, many of which have been found to consist chemically of an active agent, or "prosthetic group," combined with a "substrate" which is protein in nature; (2) vitamines or vitazymes whose functions are known to include the catalysis of oxidative respiratory or assimilation processes in the plant and animal cell, many of which are known to be chemically identical with the prosthetic group of oxidation enzymes; (3) the auxins, sometimes called "plant hormones" or "plant vitamines" whose physiological function is to catalyze the oxidative processes involved in growth of plants, many of which are of a known chemical structure and (4) various other substances of diverse chemical nature which are reversibly oxidized or reduced or are autooxidizable and which are known to function as catalysts for biological oxidations. As will be explained presently in connection with specific members of these sub-classes many well-known biological oxidation catalysts may fall in several of the above sub-classes.

Among the oxidation enzymes included in the scope of this invention there may be mentioned: the iron-porphyrin-protein enzymes which consist of an iron porphyrin complex as the prosthetic group or active agent combined with a protein, specific examples of which are catalase, peroxidase, the various cytochromes and cytochrome oxidase (Warburg's respiratory enzyme); the nucleotide enzymes and coenzymes, the coenzymes being adenine mononucleotides (compounds of a sugar, a phosphoric acid and adenine) or adenine dinucleotides containing pyridinium compounds such as nicotinic acid amide as additional components, and the enzymes being complexes containing such coenzymes as the prosthetic group combined with a protein, specific examples of which enzymes and coenzymes are cozymase, cophosphorolase, codehydrogenase (Warburg's coferment), certain oxidases and the various dehydrogenases; the flavoprotein enzymes which consist of a flavin (a compound containing the isoalloxazine nucleous such as lactoflavin (riboflavin) or lumiflavin) the phosphoric and pyrophosphoric esters of such flavins and the adenine nucleotides containing such flavins as components, as the prosthetic group combined with a protein, specific examples of which flavoprotein enzymes are Warburg's yellow enzyme, xanthine oxidase and aldehyde oxidase; the thiaminoprotein enzymes which consist of thiamine or a thiamine derivative such as the hydrochloride, phosphate or pyrophosphate, as the prosthetic group combined with a protein, specific examples of which enzymes are carboxylase and pyruvic oxidase; and other oxidation-reduction enzymes which have not been definitely determined to be of any of the above types specific examples of which are alpha-hydroxyglutaric dehydrogenase, uricase, amine oxidase, glyoxalase, nitratase, ascorbic oxidase and the like. The method of obtaining these oxidation enzymes or extracts or preparations containing them from cells or tissues is well known and consists generally in rupturing the cell wall by freezing and thawing or macerating the tissues and then extracting the enzyme with a solvent. Tissues which are particularly rich in oxidation enzymes include the heart and kidney of various animals such as the ox, pig and sheep. Plants, particularly the yeasts and various bacteria cultures are also excellent sources of oxidation enzymes as is well known to the art.

Another important sub-class of biological oxidation catalysts are the vitamines which catalyze respiratory or assimilative processes in the cell. As mentioned above, many of such vitamines are known to be chemically identical with the prosthetic groups of various oxidation enzymes and are called vitazymes; other vitamines are also believed to possess a similar function in enzymes whose constitution has not been definitely ascertained. Examples of such vitamines or vitazymes include thiamine hydrochloride or vitamine B₁ and its derivatives such as vitamine B₁ pyrophosphate, lactoflavin or riboflavin (vitamine B₂); nicotinic acid (a component of the vitamine B complex) and its amide and other components of the vitamine B complex as well as ascorbic acid (vitamine C) and biotin (vitamine H).

Still another sub-class of biological oxidation catalysts comprises the auxins, i. e., substances which function to catalyze the oxidative processes involved in the growth of plants. Chemically such substances generally are compounds containing a ring structure such as an aromatic or heterocyclic ring, and a side chain containing a carboxylic acid group attached to a carbon atom in the side chain. Many auxins possess a chemical structure which may be represented as

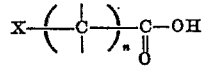

wherein X is a ring structure comprising an aromatic ring and $n$ is an integer less than ten, usually less than four. Examples of such auxins include phenyl acetic acid, naphthalene acetic acid, indole acetic acid, phenyl propionic acid, naphthalene propionic acid, indole propionic acid, indole butyric acid and the like. Other auxins include naphthoxy acetic acid and biotin or vitamine H which has the formula

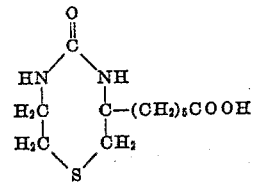

Other well-known biological oxidation catalysts, not mentioned hereinabove, include the so-called biological "mesocatalysts" or "intermediate catalysts" which catalyze biological oxidations by being themselves autooxidizable or capable of undergoing reversible oxidation-reduction, thus promoting some other oxidative process. Substances exerting this function include biological mesocatalysts possessing a quinoid structure such as pyocyanine (N-methyl-α oxyphenazine), and other hydroxy phenazines, oxychloraphine (phenazine-α-carbonamide) and its reduced form chloraphine, toxoflavin, phthiocol and other naphthoquinones such as lapachol, lomatiol, and the like; reversible oxidation-reduction systems containing an S—H or S—S structure such as glutathione, cystine and cysteine, insulin and the like; the mesocatalysts of metabolism such as fumaric acid, malic acid, citric acid, α-hydroxy butyric acid, pyruvic acid, acetoacetic acid, glycocollic acid, nucleic acids and other aliphatic acids containing from 2 to 6 carbon atoms which are formed during the oxidation of sugars—i. e., the so-called "sugar reductones"—and which function to catalyze further biological oxidations. Ascorbic acid (vitamine C) which undergoes a reversible oxidation reduction reaction, is also such a biological mesocatalyst. Other mesocatalysts involved in metabolism include creatine and creatinine, adenine, guanine, allantoin, xanthine, uric acid and the like.

Still another class of substances which catalyze many oxidative processes occurring in the living cell are the simple and complex salts of those heavy metals which are essential to life such as the heavy metals of the iron family, i. e., iron, cobalt and nickel. The use of such heavy metal salts as catalysts for emulsion polymerization is more fully disclosed and claimed in my copending applications Serial Nos. 379,713 to 379,717 filed February 19, 1941 and Serial No. 475,795 filed February 13, 1943. Other copending applications which more fully disclose and claim certain substances which catalyze biological oxidations as well as related chemical substances are my copending application Serial No. 440,852, filed April 28, 1942, which discloses and claims inter alia the use of glutathione, cystine and cysteine (biological mesocatalysts mentioned above) in the emulsion polymerization of butadiene; my copending application Serial No. 379,715, filed February 19, 1941, which discloses and claims inter alia the use of glutathione, cystine and cysteine in combination with salts of iron, cobalt and nickel as catalysts for emulsion polymerizations; my copending application Serial No. 379,-714, filed February 19, 1941, which discloses and claims inter alia the use of pyruvic and acetoacetic acid (biological mesocatalysts mentioned above) in combination with salts of iron, cobalt and nickel as catalysts for emulsion polymerization; my copending application Serial No. 439,101 filed April 15, 1942, which discloses and claims inter alia the use of fumaric and citric acids (biological mesocatalysts mentioned above) in combination with salts of iron, cobalt and nickel as catalysts for emulsion polymerization and my copending application Serial No. 416,087, filed October 22, 1941, which discloses and claims inter alia the use of creatine, creatinine, hydantoin etc., (biological mesocatalysts mentioned above) as catalysts for emulsion polymerization.

The choice of the particular biological oxidation catalyst to be used in any given emulsion polymerization, in accordance with this invention, will depend upon a number of factors including the nature of the compounds polymerized, the nature of the emulsifying agent present in the emulsion and the nature of the other substances, such as the polymerization initiators etc., which are present in the emulsion. The cost and availability of the biological oxidation catalyst as well as its purity are also important factors. For this latter reason it is generally preferred to employ biological oxidation catalysts whose chemical structure is well known and which are available commercially in purified form such as thiamine hydrochloride or vitamine B₁, and other vitamines of the B-complex; ascorbic acid or vitamine C, auxins of the

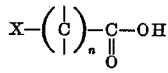

type wherein X is phenyl, naphthyl or indoxyl and $n$ is an integer less than four, and the 2 to 6 carbon atom acid sugar "reductones." Mixtures of such substances with salts of heavy metals of the iron family are also particularly useful. When oxidation enzymes are used, however, it is preferable to employ mixtures of such enzymes obtained from natural sources such as animal liver, heart and kidney, and bacterial and yeast cultures rather than to isolate and purify single oxidation enzymes.

In the practice of the invention the addition polymerization of unsaturated organic compounds to form high molecular weight linear polymers is effected in an aqueous emulsion in the presence of a catalytic amount of one or more of the above-described catalysts for biological oxidations. The term "catalytic amount" as used herein is meant to designate that the proportion of the biological catalyst present in the emulsion is about the same as that in which these substances are present in biological systems. This amount is very small in comparison to the total amount of the emulsion and to the total amount of the substance or substances polymerized. In general amounts of the biological catalyst less than 1% and preferably less than .1% may be said to be catalytic amounts, the preferred range of concentration of the biological oxidation catalyst being in most instances from 0.001 to 0.05% or even less based on the materials polymerized. When mixtures of biological oxidation catalysts are employed, the total proportion of oxidation catalyst present is also preferably within this range.

As has been mentioned hereinabove the biological oxidation catalysts of this invention may be used generally in the polymerization in aqueous emulsion of those unsaturated organic compounds which contain at least one olefinic double bond and which undergo in aqueous emulsion an addition polymerization to form a high molecular weight linear polymer. Olefinic compounds which undergo such addition polymerizations in aqueous emulsion generally contain the characteristic structure

wherein at least two of the disconnected valences are attached to hydrogen, at least one of the disconnected valences is attached to a radical more electronegative than alkyl radicals and all of the disconnected valences are attached to separate atoms or groups. Radicals more electronegative than alkyl radicals include halogen atoms and organic groups containing unsaturated linkages such as vinyl, phenyl, nitrile, carboxyl or the like. Included in this class of monomers are the open-chain aliphatic conjugated dienes (which contain two olefinic double bonds in conjugated relation) such as butadiene-1,3, 2,3-dimethyl butadiene-1,3, isoprene, chloroprene, 3-furyl butadiene-1,3 3-methoxy butadiene-1,3 and the like; the vinyl compounds (which contain a single olefinic double bond present in the structure

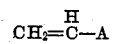

wherein A is a radical more electronegative than alkyl) such as styrene, vinyl naphthalene, p-chloro styrene, p-methoxy styrene, acrylic acid, methyl acrylate, ethyl acrylate, acrylonitrile, acrylamide, methyl vinyl ketone, methyl vinyl ether, vinyl ethinyl alkyl carbinole, vinyl acetate, vinyl chloride, vinyl furane, vinyl carbazole and the like, the vinylidene compounds (which contain the structure

wherein at least one of the disconnected valences is attached to a radical more electronegative than alkyl) such as vinylidene chloride, methyl isopropenyl ketone, alpha-substituted acrylic acids and their esters, amides and nitriles such as methyl methacrylate, ethyl methacrylate, methacrylamide, methacrylonitrile, methyl ethacrylate, methyl alpha-chloro acrylate and the like; as well as other polymerizable compounds containing a single olefinic double bond such as diethyl fumarate and the like. Such olefinic compounds may be polymerized alone, in which case single linear polymers are formed, or mixtures of two or more of such compounds which are copolymerizable with each other may be polymerized to form linear copolymers.

The biological oxidation catalysts of this invention are particularly effective when the monomeric material polymerized is a butadiene-1,3 hydrocarbon, by which is meant butadiene-1,3 itself and its hydrocarbon homologs, or is a mixture of a butadiene-1,3 hydrocarbon with a lesser amount of at least one other compound which contains a single olefinic double bond and is copolymerizable therewith in aqueous emulsion such as styrene, acrylonitrile, acrylic and substituted acrylic acids, esters, nitriles and amides, methyl isopropenyl ketone, vinylidene chloride, diethyl fumarate and similar compounds of the type mentioned above. In this case, as in other instances where the monomers polymerized consist predominately of open-chain aliphatic conjugated dienes, the products of the polymerization are high molecular weight linear polymers and copolymers which are rubbery in character and may be called synthetic rubber. However, the polymerization of other monomers and monomer mixtures of the type described to form linear polymers or copolymers of a resinous character is also catalyzed by the biological oxidation catalysts of this invention.

As emulsifying agents to be used in forming the emulsions of these unsaturated organic compounds, there may be mentioned soaps such as sodium oleate, potassium palmitate, sodium myristate and similar fatty acid soaps as well as synthetic saponaceous materials including hymolal sulfates and alkaryl sulfonates such as sodium lauryl sulfate, sodium isobutyl naphthalene sulfonate, sodium isobutyl phenyl sulfonate and the like and salts of organic bases containing long carbon chains such as trimethyl-cetyl-ammonium methyl sulfate, the hydrochloride of oleylamidoethyl dimethylamine, the hydrochloride of diethylaminoethyloleylamide and the like. Since the nature of the emulsifying agent will often determine the pH of the emulsion and since many of the biological oxidation catalysts of this invention give best results at a certain optimum pH, it is important to bear in mind the nature of the oxidation catalyst when selecting the emulsifying agents. Such oxidation catalysts as the vitamines of the B group, vitamine C and such auxins as indole acetic acid and indole propionic acid give best results in emulsions having a pH less than seven; hence, emulsifying agents of the hymolal sulfate or alkaryl sulfonate type which may be used with buffers to produce an acid emulsion are preferred. On the other hand many oxidation enzymes and certain biological mesocatalysts of metabolism are most active as catalysts at a pH of from about 7 to 9 and accordingly with such catalysts the cheaper fatty acid soap emulsifying agents, which give a slightly alkaline pH when only a part of the fatty acids present are neutralized with alkali to form soap, may be effectively employed. It should also be mentioned that various proteins and proteoids, which are capable of emulsifying the monomers in an aqueous medium may also be employed as emulsifying agents and are especially useful in connection with oxidation enzymes since the conditions prevalent in the living cell, the natural habitat of many biological enzymes, are thus more nearly approached.

In addition to the monomers, emulsifying agent and biological oxidation catalyst, the emulsion to be polymerized will also ordinarily contain one or more polymerization initiators. The preferred initiators to be employed with biological oxidation catalysts are the oxygen-yielding initiators of polymerization or oxidants such as the peroxides including hydrogen peroxide, dibenzoyl peroxide, diethyl peroxide, t-butyl hydroperoxide and similar organic and inorganic peroxides, the per-salts including potassium persulfate, sodium perborate, sodium periodate, potassium percarbonate and the like, as well as oxygen, ozone, and organic ozonides. When biological oxidation catalysts such as vitamines of the B group, vitamine C and auxins are employed as the catalyst, it has been found particularly desirable to employ a per-salt as the initiator of polymerization. With certain oxidation enzymes, on the other hand, molecular oxygen and hydrogen peroxide are the preferred initiators.

It is also often desirable to include in the emulsion, together with the oxygen-yielding initiator of polymerization and the biological oxidation catalyst, small amounts of reducing agents or reductants which are readily oxidized by the oxygen-yielding initiator and which do not inhibit the polymerization. Such substances include sulfur dioxide, alkali metal sulfites, cobaltous chloride and other reducing heavy metal salts, which are also initiators of polymerization, sugars, certain sulfur-containing organic compounds such as beta-mercapto ethanol, and lauryl mercaptan; aldehydes, aliphatic carboxylic acids and the like.

Polymerization modifiers (substances which increase the plasticity and elasticity of the polymeric product) are also preferably present in the emulsion during the polymerization, especially in the emulsion polymerization of open-chain aliphatic conjugated dienes. Well-known polymerization modifiers include sulfur-containing organic compounds such as aliphatic mercaptans, dialkyl dixanthogens, tetraalkyl thiuram mono- and polysulfides, mercaptoalkyl thiazoles and the like. Many such compounds may also function as reducing agents to be oxidized by the oxygen-yielding initiator present.

The preferred method of practicing the invention and the improved results obtained by employing biological oxidation catalysts as catalysts for emulsion polymerizations are further shown by the following specific examples which are intended to illustrate rather than limit the invention.

*Example I*

A mixture of 88 parts of butadiene-1,3 and 72 parts of acrylonitrile is emulsified in 250 parts of a 3% aqueous solution of a sodium alkaryl sulfonate as emulsifying agent. A sufficient amount of sodium phosphate buffer is added to give the emulsion a pH of about 4.3. There is then added to the emulsion 0.30 part of potassium persulfate as the initiator and 0.05 part of ascorbic acid (vitamine C) as the catalyst, and the emulsion is agitated at 30° C. until polymerization is substantially complete. The polymerization requires 28 hours and yields a concentrated latex containing about 40% by weight of a rubbery copolymer of butadiene-1,3 and acrylonitrile. In the absence of the ascorbic acid the polymerization requires 56 hours.

*Examples II and III*

Example I is twice repeated except that the auxins B-indole-3-acetic acid and B-indole-3-propionic acid are in turn substituted for the ascorbic acid. The following results are obtained:

| Catalyst | Time | Yield |
| --- | --- | --- |
| | Hours | Per cent |
| B-indole-3-acetic acid | 32 | 98 |
| B-indole-3-propionic acid | 34 | 98 |

Example IV

Example I is again repeated except that the emulsion was buffered to a pH of 2.0 with pyrophosphoric acid and that 0.001 part of ferric chloride and 0.0005 part of cobalt chloride are included in the emulsion. A quantitative yield of polymer is obtained in only 23 hrs., only one-half of the time required when no ascorbic acid or heavy metal salts are present during the polymerization. The latex-like dispersion obtained as the product was also outstanding in that it could be used to deposit thin synthetic rubber films of exceptional strength. Alternatively it may be coagulated in the usual manner to yield the rubbery butadiene-1,3 acrylonitrile copolymer.

Example V

A mixture of 55 parts of butadiene-1,3 and 45 parts of acrylonitrile is emulsified in 250 cc. of a 2% aqueous solution of myristic acid which is 85% converted into soap by neutralization with sodium hydroxide. 3 parts of potassium persulfate, 0.3 part of lorol mercaptan as a polymerization modifier, and 0.02 part of thiamine hydrochloride (vitamine B₁) are added to the emulsion and the emulsion is agitated at 60° C. until polymer is formed. The polymerization is substantially complete in only 6½ hrs. and yields a strong plastic rubbery copolymer of butadiene-1,3 and acrylonitrile. In the absence of the thiamine the polymerization required 16 hrs. to reach 75% completion at 60° C. and the product was not so strong nor plastic as was the product employing thiamine as the catalyst.

Example VI

A mixture of 55 parts of butadiene-1,3 and 45 parts of acrylonitrile is agitated at 30° C. in an aqueous emulsion containing 250 parts of a 2% aqueous solution of sodium lauryl sulfate, 2 parts of sodium periodate, 0.01 part of cobaltous chloride and 0.5 part of thiamine hydrochloride (vitamine B₁). The polymerization was complete in 45 hours and yielded 98 parts of a rubbery butadiene-1,3 acrylonitrile copolymer. In the absence of the thiamine hydrochloride the polymerization required 110 hours and a still longer time in the absence of both the thiamine hydrochloride and the cobaltous chloride.

Example VII

Example VI is repeated using 0.75 part of beta (indole-3-propionic acid) in place of the thiamine hydrochloride. The polymerization is complete in only 15 hours.

Example VIII

A mixture of 70 parts of butadiene-1,3 and 30 parts of styrene is emulsified in 250 cc. of a 2% aqueous solution of sodium myristate to form an aqueous emulsion. 10 parts of a 3½% solution of hydrogen peroxide, 0.45 part of diisopropyl dixanthogen as a polymerization modifier, and 0.02 part of thiamine hydrochloride. The emulsion is then agitated at 30° C. for 60 hours whereupon a synthetic latex is obtained which, when coagulated, produces a 99% yield of a rubbery copolymer of butadiene-1,3 and styrene. When a similar emulsion is polymerized without the addition of the thiamine the polymerization requires over 150 hours.

Examples IX to XII

Example VIII is repeated using in place of the thiamine hydrochloride other biological oxidation catalysts. The yield and time of polymerization are shown as follows:

| | Catalyst | Yield | Time |
| --- | --- | --- | --- |
| | | Per cent | Hours |
| Example IX | Indole-3-acetic acid | 97 | 45 |
| Example X | B-hydroxy butyric acid | 96 | 31 |
| Example XI | Creatinine | 95 | 23 |
| Example XII | Nucleic acid | 98 | 23 |

Other methods and procedures known to be useful with the polymerization of unsaturated organic compounds are within the spirit and scope of the invention as defined in the appended claims.

I claim:

1. The process which comprises polymerizing in aqueous emulsion a polymerizable material consisting of a mixture of butadiene-1,3 and a lesser amount of a vinyl compound copolymerizable therewith in aqueous emulsion, the said emulsion containing a quantity of the said polymerizable material emulsified in a greater quantity of a continuous water phase by means of an emulsifying agent, and the said emulsion also containing an oxygen-supplying initiator of polymerization and a catalytic amount, which is between 0.001 and 1% by weight of the polymerizable material, of an auxin having the chemical structure

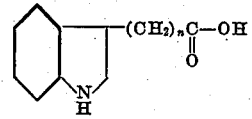

wherein n is an integer from 1 to 4.

2. The process which comprises polymerizing in aqueous emulsion a polymerizable material comprising butadiene-1,3, the said emulsion containing a quantity of the said polymerizable material emulsified in a greater quantity of a continuous water phase by means of an emulsifying agent, and the said emulsion also containing an oxygen-supplying initiator of polymerization and a catalytic amount, which is between 0.001 and 1% by weight of the polymerizable material of indole-3-propionic acid.

3. The process which comprises polymerizing a mixture of butadiene-1,3 and styrene in an aqueous emulsion containing a quantity of said mixture emulsified in a greater quantity of a continuous water phase by means of an emulsifying agent, potassium persulfate and a catalytic amount, which is between 0.001 and 1% by weight of the said mixture, of an auxin having the chemical structure

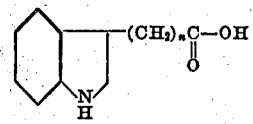

wherein n is an integer from 1 to 4.

4. The process which comprises polymerizing a mixture of butadiene-1,3 and styrene in an aqueous emulsion containing a quantity of said mixture emulsified in a greater quantity of a continuous water phase by means of an emulsifying agent, potassium persulfate and a catalytic amount, which is between 0.001 and 1% by weight of the said mixture, of indole-3-propionic acid.

WILLIAM D. STEWART.

REFERENCES CITED

The following references are of record in the file of this patent:

UNITED STATES PATENTS

| Number | Name | Date |
|---|---|---|
| 1,953,169 | Gibbons | Apr. 3, 1934 |
| 2,067,234 | Gordon | Jan. 12, 1937 |
| 2,234,076 | Gumlich | Mar. 4, 1941 |
| 2,356,974 | Clifford | Aug. 29, 1944 |

FOREIGN PATENTS

| Number | Country | Date |
|---|---|---|
| 301,515 | Great Britain | Mar. 3, 1930 |
| 312,949 | Great Britain | June 4, 1929 |
| 318,115 | Great Britain | Aug. 26, 1929 |
| 323,721 | Great Britain | Jan. 3, 1930 |
| 333,894 | Great Britain | Aug. 18, 1930 |
| 511,145 | Germany | Oct. 27, 1930 |